(12) United States Patent
Jagadeeswaran et al.

(10) Patent No.: US 11,928,174 B2
(45) Date of Patent: Mar. 12, 2024

(54) CENTRALIZED DYNAMIC PORTAL FOR CREATING AND HOSTING STATIC AND DYNAMIC APPLICATIONS

(71) Applicant: BANK OF AMERICA CORPORATION, Charlotte, NC (US)

(72) Inventors: Arunkumar Jagadeeswaran, Tamilnadu (IN); Ketan Ghelani, Maharashtra (IN); Sathis Kumar Karuppannan, Tamilnadu (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 100 days.

(21) Appl. No.: 17/399,322

(22) Filed: Aug. 11, 2021

(65) Prior Publication Data
US 2023/0051241 A1 Feb. 16, 2023

(51) Int. Cl.
G06F 16/958 (2019.01)
G06F 21/31 (2013.01)
G06F 40/186 (2020.01)

(52) U.S. Cl.
CPC .......... G06F 16/958 (2019.01); G06F 21/31 (2013.01); G06F 40/186 (2020.01); *G06F 2221/2141* (2013.01)

(58) Field of Classification Search
None
See application file for complete search history.

(56) References Cited

U.S. PATENT DOCUMENTS

| | | | | |
|---|---|---|---|---|
| 9,547,482 B2* | 1/2017 | Soffer | ...................... | G06F 8/20 |
| 9,727,315 B2* | 8/2017 | Sharma | ...................... | G06F 8/61 |
| 9,727,623 B1* | 8/2017 | Catania | ............... | G06F 16/2379 |
| 9,898,259 B2* | 2/2018 | Soffer | ....................... | G06F 8/34 |
| 10,902,254 B2* | 1/2021 | Lodhia | ..................... | G06V 30/422 |
| 10,963,636 B1* | 3/2021 | Kumar | .................. | G06F 40/205 |
| 11,086,602 B2* | 8/2021 | Scolnick | .................. | G06F 8/38 |
| 11,151,313 B2* | 10/2021 | Chua | ....................... | G06F 16/93 |
| 11,151,480 B1* | 10/2021 | Golovidov | ............ | G06F 16/958 |
| 11,321,422 B1* | 5/2022 | Stone | ..................... | G06F 3/0486 |
| 2010/0174974 A1* | 7/2010 | Brisebois | ............... | G06Q 10/00 715/780 |
| 2015/0128249 A1* | 5/2015 | Alexandrian | ........... | G06F 21/62 726/16 |
| 2015/0186132 A1* | 7/2015 | Oliveri | ..................... | G06F 8/34 717/120 |

(Continued)

*Primary Examiner* — Howard Cortes
(74) *Attorney, Agent, or Firm* — Moore & Van Allen PLLC; Nicholas C. Russell (57) ABSTRACT

Embodiments of the present invention provide a system for creating and hosting static and dynamic applications. The system is configured for receiving one or more inputs from at least one user, wherein the one or more inputs are associated with creation of one or more applications, extracting one or more templates and present the one or more templates to the at least one user, selecting a template of the one or more templates, automatically selecting a server from one or more servers to host the one or more applications, establishing a connection to the server and extract a data set from the server, rendering data in the data set and apply the data to the template, via an artificial intelligence engine, generating one or more template previews based on applying the data to the template, and displaying the one or more template previews to the at least one user.

20 Claims, 7 Drawing Sheets

(56) References Cited

U.S. PATENT DOCUMENTS

| | | | | |
|---|---|---|---|---|
| 2016/0063416 | A1* | 3/2016 | Sharma | G06Q 10/06313 |
| | | | | 705/7.23 |
| 2017/0024363 | A1* | 1/2017 | Tocchini | G06N 7/01 |
| 2017/0132177 | A1* | 5/2017 | Tocchini | G06F 40/279 |
| 2017/0286388 | A1* | 10/2017 | Tamilarasan | G06F 3/0482 |
| 2018/0349730 | A1* | 12/2018 | Dixon | G06V 10/772 |
| 2019/0278928 | A1* | 9/2019 | Rungta | G06F 9/5077 |
| 2021/0034225 | A1* | 2/2021 | Harazi | G06F 3/04847 |
| 2022/0170915 | A1* | 6/2022 | Van Den Boom | G16H 10/40 |
| 2022/0399098 | A1* | 12/2022 | Zhang | G16H 20/60 |
| 2022/0414179 | A1* | 12/2022 | Gulati | G06F 16/951 |

* cited by examiner

CENTRALIZED DYNAMIC PORTAL FOR CREATING AND HOSTING STATIC AND DYNAMIC APPLICATIONS

BACKGROUND

Typically, users have to create applications from scratch. Additionally, users have to use different infrastructure to host the developed applications, thereby making it difficult to monitor the applications. As such, there exists a need for a system that allows users to create and host static and dynamic applications.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for dynamically creating and hosting static and dynamic applications. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention identifies that at least one user logged into a centralized web portal, authenticate the at least one user based on determining that the at least one user logged into the centralized web portal, receives one or more inputs from the at least one user, via the centralized web portal, wherein the one or more inputs are associated with creation of one or more applications, based on the one or more inputs, extracts one or more templates and present the one or more templates to the at least one user, via the centralized web portal, selects a template of the one or more templates, automatically selects a server from one or more servers to host the one or more applications, establishes a connection to the server and extract a data set from the server, renders data in the data set and apply the data to the template, via an artificial intelligence engine, generates one or more template previews based on applying the data to the template, and displays the one or more template previews to the at least one user, via the centralized web portal.

In some embodiments, the present invention receives an input associated with the one or more template previews from the at least one user, via the centralized web portal and publishes the template with the data on the server based on receiving the input associated with the one or more template previews.

In some embodiments, the present invention prompts the at least one user to select the template of the one or more templates and receives a selection of the template from the at least one user.

In some embodiments, the present invention automatically selects the template, via the artificial intelligence engine, wherein the automatic selection of the template is based on at least one of user preferences of the at least one user and historical template selection data.

In some embodiments, the present invention instantaneously and automatically generates the template, wherein the template is based on at least one of user preferences of the at least one user and historical template selection data.

In some embodiments, the present invention identifies a role associated with the at least one user based on authenticating the at least one user and determines that the server of the one or more server is available for the role associated with the at least one user.

In some embodiments, the one or more applications may be a static application or a dynamic application.

In some embodiments, the one or more third party systems comprise one or more satellite systems, one or more social networking systems, one or more news media systems, and one or more other entity systems. The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be any organization that develops and/or hosts applications, where the applications may perform one or more organizational activities. In some embodiments, the entity may be a financial institution which may include herein may include any financial institutions such as commercial banks, thrifts, federal and state savings banks, savings and loan associations, credit unions, investment companies, insurance companies and the like. In some embodiments, the entity may be a non-financial institution.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more applications provided by the entity and/or the system of the present invention. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Typically multiple applications are created within an entity by one or more teams comprising one or more users. Each of these applications are developed from scratch using different frameworks and each of the applications are hosted on different servers. As a result, it becomes challenging to monitor the applications and the developed applications may not be consistent in terms of standards set by the entity. Additionally, over utilization of servers may take place when all of such applications are hosted on a particular server, thereby slowing the server and causing the one or more applications to slow down. As such, there exists a need for a system that allows the one or more users to create and host static and dynamic applications efficiently. The system of the present solves the aforementioned problem and allows the one or more users to dynamically create and host static and dynamic applications, thereby improving utilization and processing efficiency of one or more servers associated with the entity.

Figure 1:
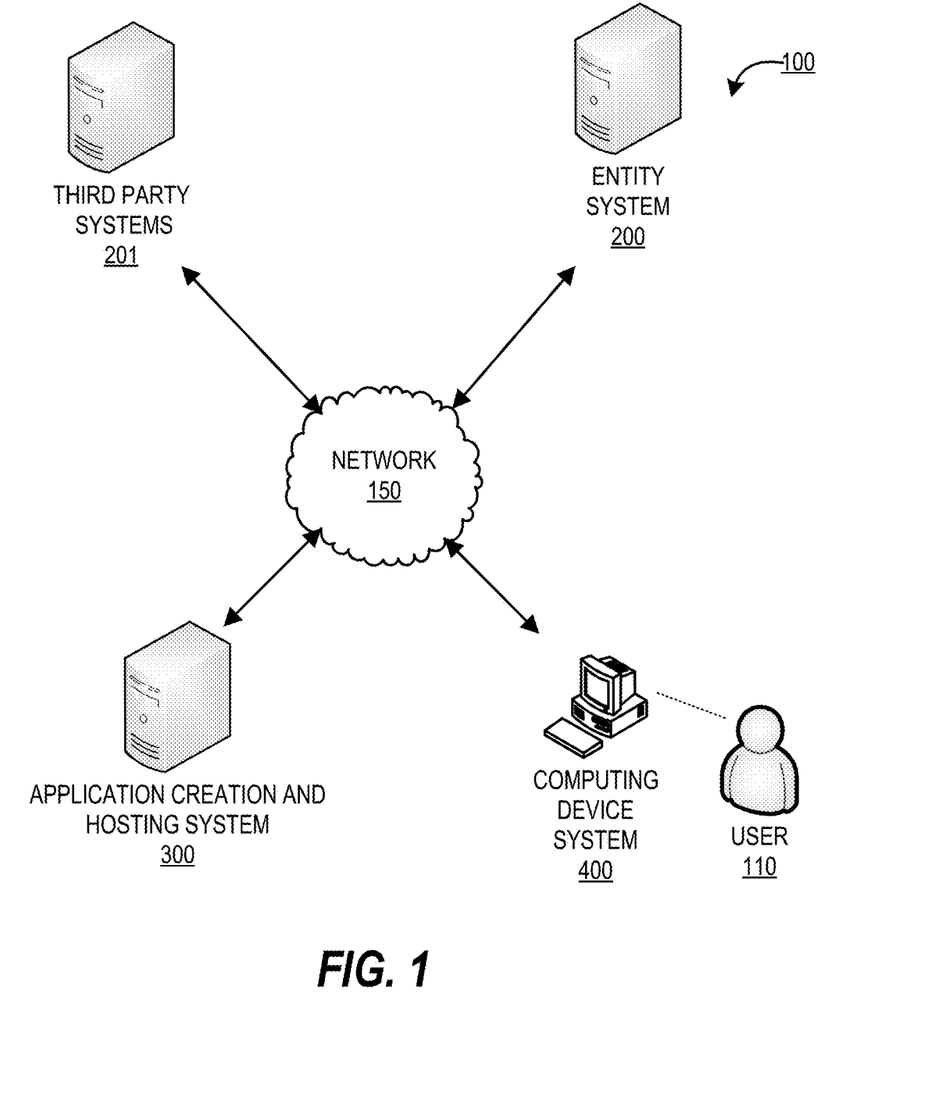
FIG. 1 provides a block diagram illustrating a system environment for dynamically creating and hosting static and dynamic applications, in accordance with an embodiment of the invention.

FIG. 1 provides a block diagram illustrating a system environment 100 for dynamically creating and hosting static and dynamic applications, in accordance with an embodiment of the invention. As illustrated in FIG. 1, the environment 100 includes an application creation and hosting system 300, an entity system 200, a computing device system 400, and one or more third party systems 201. One or more users 110 may be included in the system environment 100, where the users 110 interact with the other entities of the system environment 100 via a user interface of the computing device system 400. In some embodiments, the one or more user(s) 110 of the system environment 100 may be employees (e.g., application developers, software engineers, application testers, or the like) of an entity associated with the entity system 200.

The entity system(s) 200 may be any system owned or otherwise controlled by an entity to support or perform one or more process steps described herein. In some embodiments, the entity is a financial institution. In some embodiments, the entity may be a non-financial institution. In some embodiments, the entity may be any organization that creates and/or hosts one or more applications. The one or more third party systems 201 may include, any application configuration management systems.

The application creation and hosting system 300 is a system of the present invention for performing one or more process steps described herein. In some embodiments, the application creation and hosting system 300 may be an independent system. In some embodiments, the application creation and hosting system 300 may be a part of the entity system 200.

The application creation and hosting system 300, the entity system 200, the computing device system 400, and the third party systems 201 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the application creation and hosting system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the application creation and hosting system 300, and/or entity system 200 across the network 150.

Figure 2:
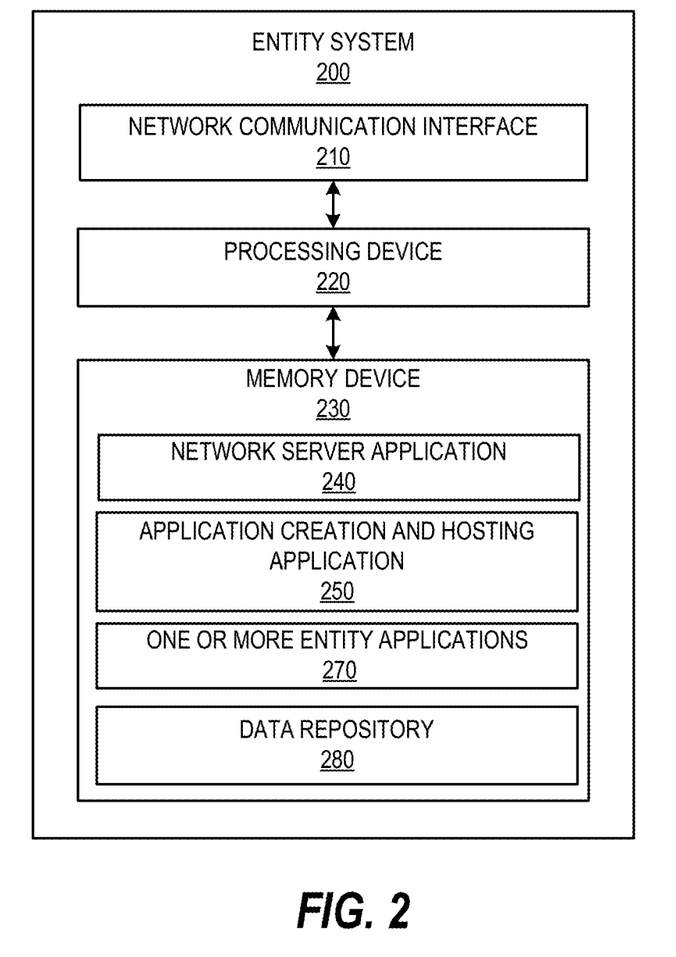
FIG. 2 provides a block diagram illustrating the entity system 200 of FIG. 1, in accordance with an embodiment of the invention.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution. In some embodiments, the entity system 200 may be a multi-tenant cluster storage system.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, an application creation and hosting application 250, one or more entity applications 270, and a data repository 280 comprising historical activity data associated with the entity and data accessed, retrieved, and/or computed by the entity system 200. The one or more entity applications 270 may be any applications developed, supported, maintained, utilized, and/or controlled by the entity. The computer-executable program code of the network server application 240, the application creation and hosting application 250, the one or more entity application 270 to perform certain logic, data-extraction, and data-storing functions of the entity system 200 described herein, as well as communication functions of the entity system 200.

The network server application 240, the application creation and hosting application 250, and the one or more entity applications 270 are configured to store data in the data repository 280 or to use the data stored in the data repository 280 when communicating through the network communication interface 210 with the application creation and hosting system 300, and/or the computing device system 400 to perform one or more process steps described herein. In some embodiments, the entity system 200 may receive instructions from the application creation and hosting system 300 via the application creation and hosting application 250 to perform certain operations. The application creation and hosting application 250 may be provided by the application creation and hosting system 300. The one or more entity applications 270 may be any of the applications used, created, modified, facilitated, and/or managed by the entity system 200.

Figure 3:
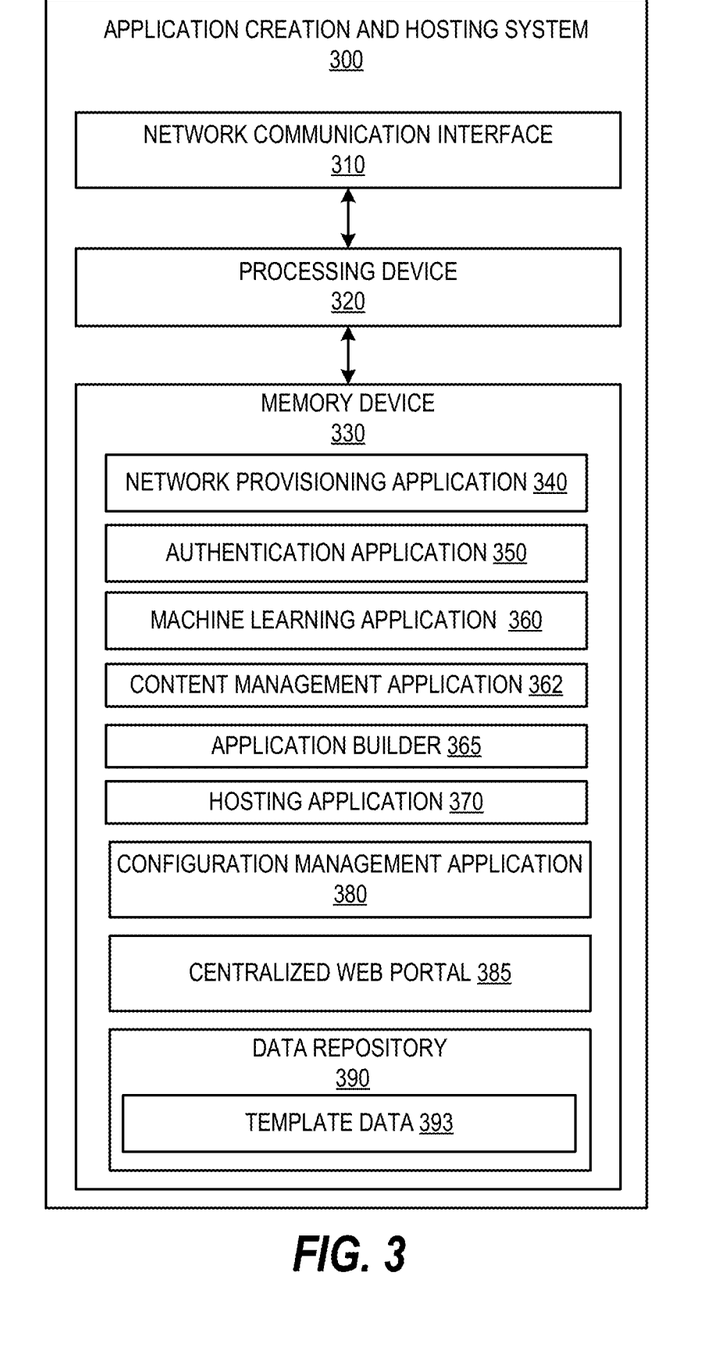
FIG. 3 provides a block diagram illustrating an application creation and hosting system 300 of FIG. 1, in accordance with an embodiment of the invention.

FIG. 3 provides a block diagram illustrating the application creation and hosting system 300 in greater detail, in accordance with embodiments of the invention. As illustrated in FIG. 3, in one embodiment of the invention, the application creation and hosting system 300 includes one or more processing devices 320 operatively coupled to a network communication interface 310 and a memory device 330. In certain embodiments, the application creation and hosting system 300 is operated by an entity, such as a financial institution. In some embodiments, the application creation and hosting system 300 is owned or operated by the entity of the entity system 200. In some embodiments, the application creation and hosting system 300 may be an independent system. In alternate embodiments, the application creation and hosting system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the application creation and hosting system 300 described herein. For example, in one embodiment of the application creation and hosting system 300, the memory device 330 includes, but is not limited to, a network provisioning application 340, an authentication application 350, a machine learning application 360, a content management application 362, an application builder 365, an hosting application 370, a configuration management application 380, a centralized web portal 385, and a data repository 390 comprising template data 393 (e.g., one or more templates, historical template data) and any other data processed or accessed by one or more applications in the memory device 330. The computer-executable program code of the network provisioning application 340, the authentication application 350, the machine learning application 360, the content management application 362, the application builder 365, the hosting application 370, the configuration management application 380, and the centralized web portal 385 may instruct the processing device 320 to perform certain logic, data-processing, and data-storing functions of the application creation and hosting system 300 described herein, as well as communication functions of the application creation and hosting system 300.

The network provisioning application 340, the authentication application 350, the machine learning application 360, the content management application 362, the application builder 365, the hosting application 370, the configuration management application 380, and the centralized web portal 385 are configured to invoke or use the data in the data repository 390 when communicating through the network communication interface 310 with the entity system 200, and/or the computing device system 400. In some embodiments, the network provisioning application 340, the authentication application 350, the machine learning application 360, the content management application 362, the application builder 365, the hosting application 370, the configuration management application 380, and the centralized web portal 385 may store the data extracted or received from the entity system 200, and the computing device system 400 in the data repository 390. In some embodiments, the network provisioning application 340, the authentication application 350, the machine learning application 360, the content management application 362, the application builder 365, the hosting application 370, the configuration management application 380, and the centralized web portal 385 may be a part of a single application.

Figure 4:
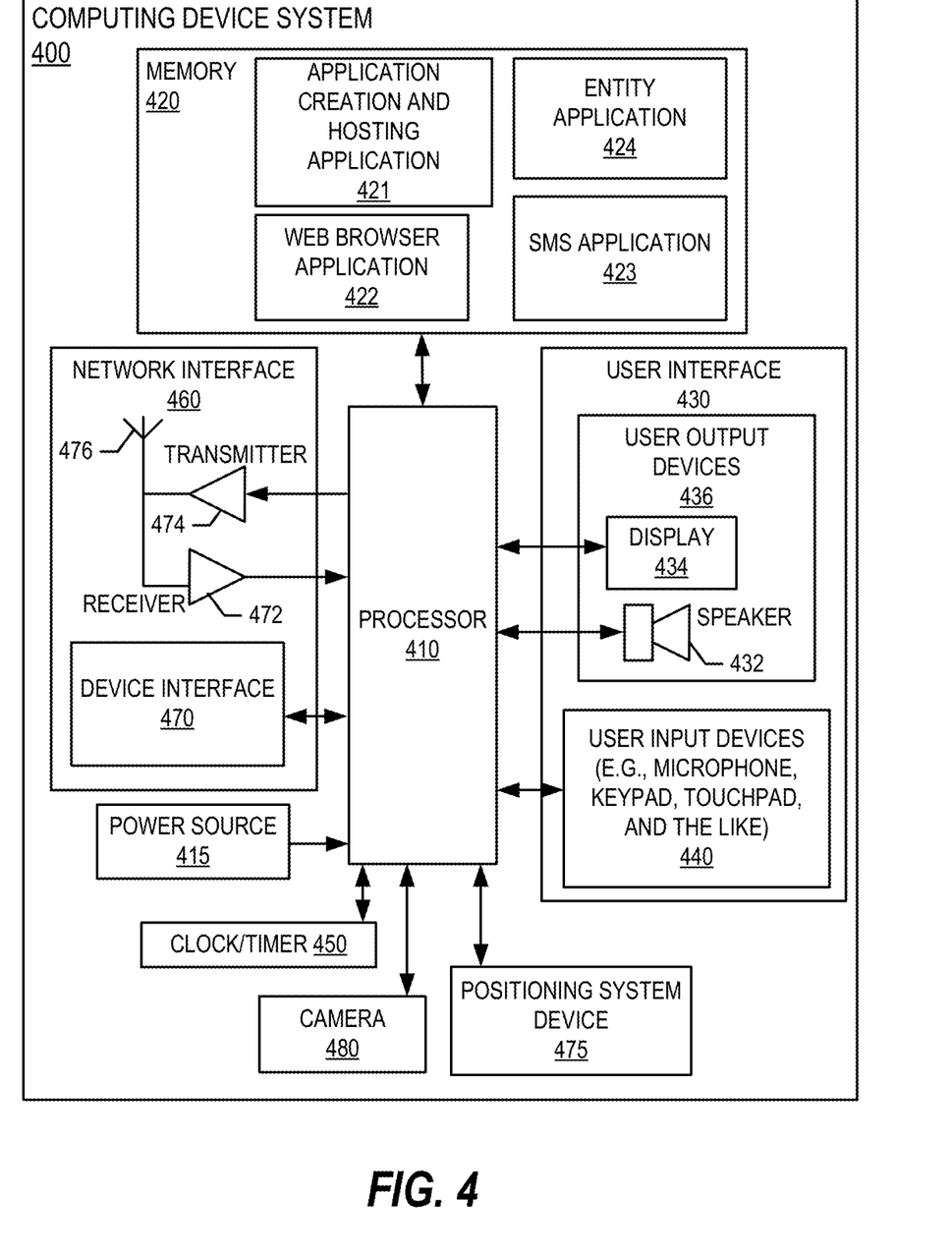
FIG. 4 provides a block diagram illustrating the computing device system 400 of FIG. 1, in accordance with an embodiment of the invention.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, an application creation and hosting application 421, entity application 424. These applications also typically instructions to a graphical user interface (GUI) on the display 430 that allows the user 110 to interact with the entity system 200, the application creation and hosting system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the application creation and hosting application 421 provided by the application creation and hosting system 300 allows the user 110 to access the application creation and hosting system 300. In some embodiments, the entity application 424 provided by the entity system 200 and the application creation and hosting application 421 allow the user 110 to access the functionalities provided by the application creation and hosting system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

Figure 5A:
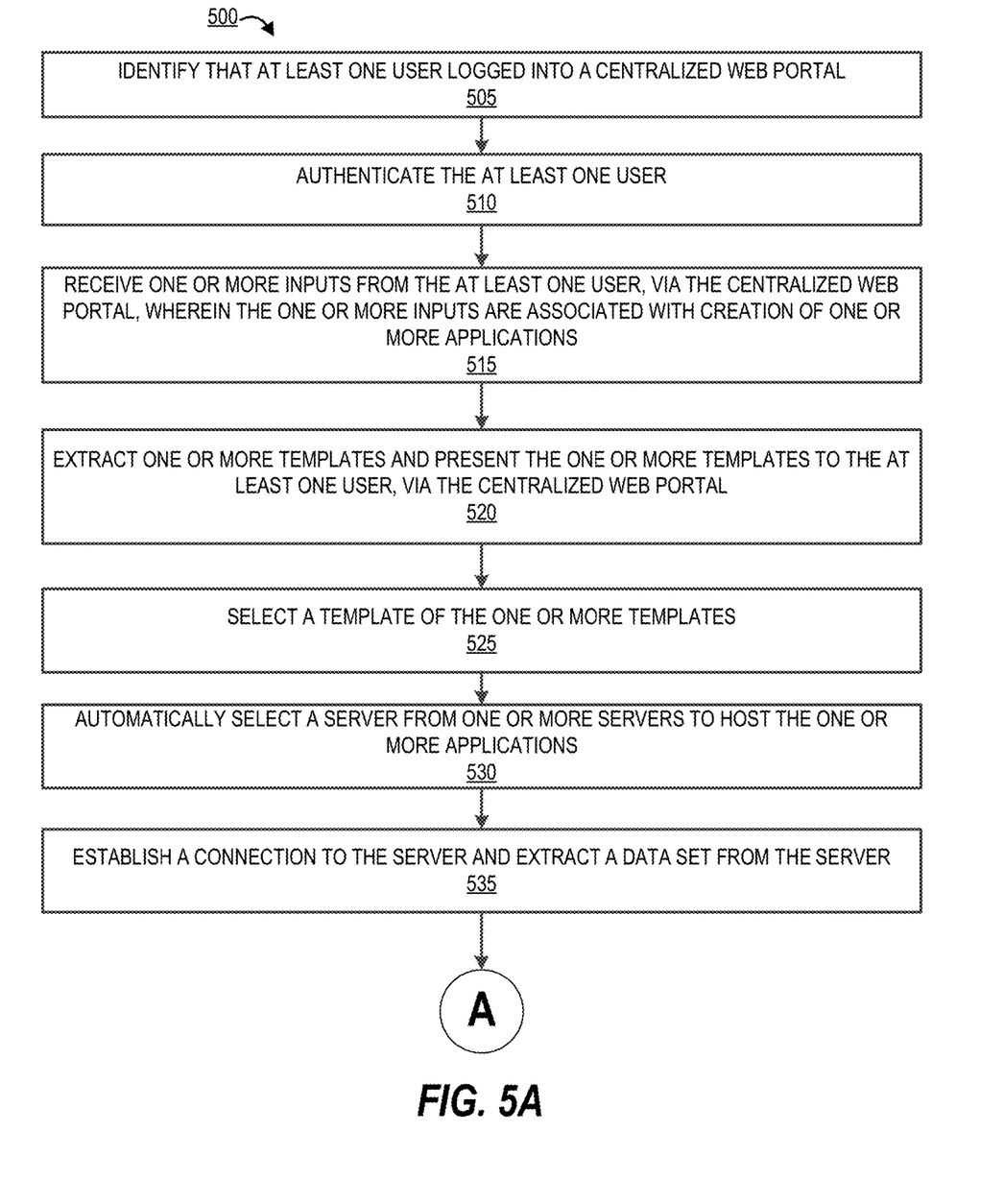
FIG. 5A and FIG. 5B provide a process flow for dynamically creating and hosting static and dynamic applications, in accordance with an embodiment of the invention.
Figure 5B:
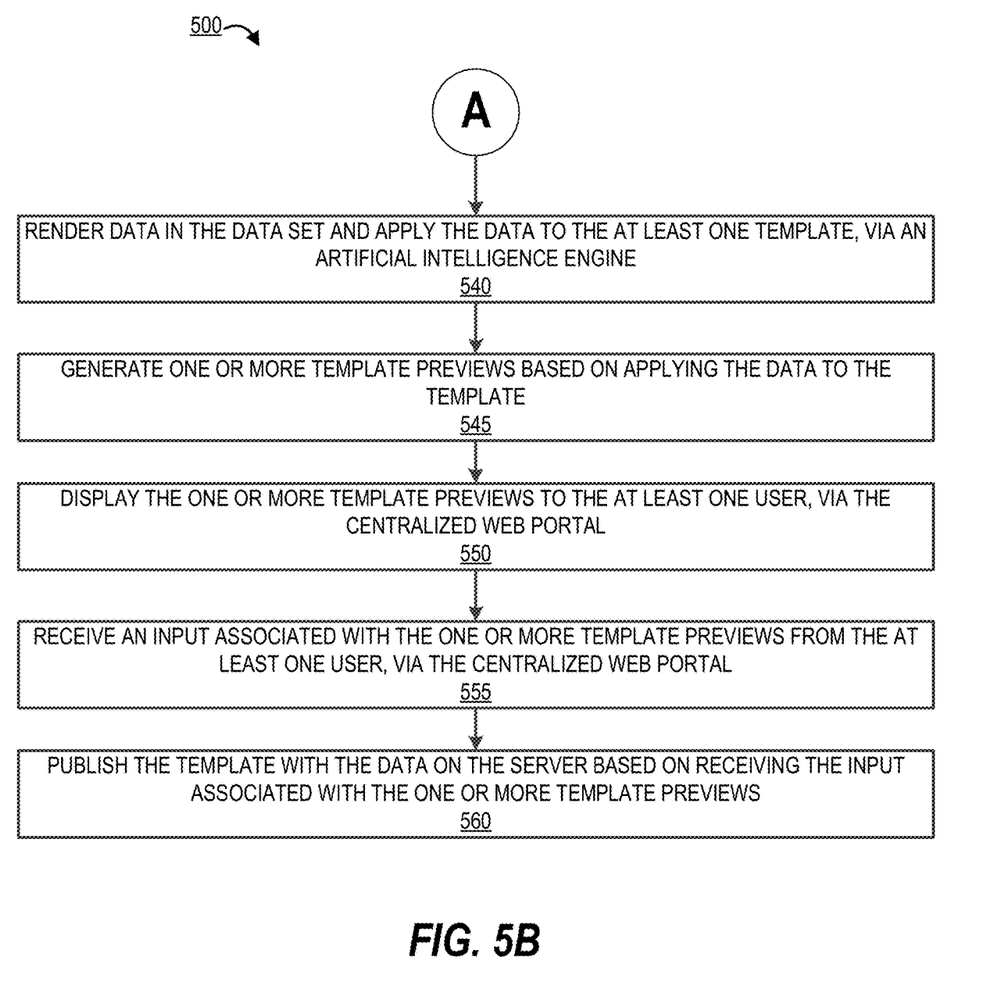

FIG. 5A and FIG. 5B provide a process flow for dynamically creating and hosting static and dynamic applications, in accordance with an embodiment of the invention. As shown in block 505, the system identifies that at least one user logged into a centralized web portal. The centralized web portal may be provided by the system of the present invention, where the centralized web portal comprises a user interface that allows the at least one user to interact with the system of the present invention and other systems as shown in FIG. 1.

As shown in block 510, the system authenticates the at least one user. The system performs authentication of the at least one user based on the user information provided by the at least one user while logging into the centralized web portal in block 505. The system may use any of the available authentication methods to authenticate the at least one user. In response to authenticating the user, the system may identify a role (e.g., application developer, or the like) associated with the user based on information present in a repository (e.g., data repository 280).

As shown in block 515, the system receives one or more inputs from the at least one user, via the centralized web portal, wherein the one or more inputs are associated with creation of one or more applications. The one or more inputs may comprise at least one of webpage, title, type of webpage, or the like. In some embodiments, the one or more inputs may include any information associated with web pages of the one or more applications. In some embodiments, the one or more applications being created may be static web applications. In some embodiments, the one or more applications being created may be dynamic web applications.

As shown in block 520, the system extracts one or more templates and present the one or more templates to the at least one user, via the centralized web portal. Based on the one or more inputs provided by the at least one user in block 515, the system extracts one or more templates from a repository. The one or more templates may be predesigned resources that show the structure for a comprehensive layout and display features associated with the one or more applications. The one or more templates may be created using one or more modules, one or more libraries (e.g., entity libraries or third party libraries), one or more frameworks, or the like. In some embodiments, at least one template of the one or more template may be generated instantaneously, via the artificial intelligence engine, where the at least one template may be generated based on at least one of historical template data (e.g., templates used within the entity) and user preferences associated with the at least one user.

As shown in block 525, the system selects a template of the one or more templates. In some embodiments, the system may prompt the user to select a template of the one or more templates. In such embodiments, the system may receive a selection of the template of the one or more templates from the at least one user. In some embodiments, the system may automatically select the template from the one or more templates based on the one or more inputs provided by the at least one user in block 515. For example, the system may select a template based on the type of webpage being created. In some embodiments, the system may automatically select the template via the artificial intelligence engine/machine learning model based on at least one of historical template data (e.g., templates used within the entity) and user preferences associated with the at least one user.

As shown in block 530, the system automatically selects a server from one or more servers to host the one or more applications. In some embodiments, the system may select the server based on the role associated with the at least on user trying to create the one or more applications. For example, an application developer may have role based access only to server 'A.' In some embodiments, the system may select the server based on utilization of the one or more servers. In some embodiments, the system may select the server based on the type of application being created.

As shown in block 535, the system establishes a connection to the server and extract a data set from the server. The data set may comprise data associated with webpage being created. In some embodiments, the dataset extracted from the server may be based on what dataset is applicable to the webpage being created and/or the datasets available for access to the role associated with the at least one user. As shown in block 540, the system renders data in the data set and apply the data to the template, via an artificial intelligence engine. The system processes the data and applies the data to the template.

As shown in block 545, the system generates one or more template previews based on applying the data to the template. In response to applying the data to the template, the system generates the one or more template previews displaying the data based on the layout present in the template. As shown in block 550, the system displays the one or more template previews to the at least one user, via the centralized web portal.

As shown in block 555, the system receives an input associated with the one or more template previews from the at least one user, via the centralized web portal. Based on the template previews, the at least one user may determine whether the template selected is appropriate for the webpage that is being created and provide the input to proceed with the template. As shown in block 560, the system publishes the template with the data on the server based on receiving the input associated with the one or more template previews.

Figure 6:
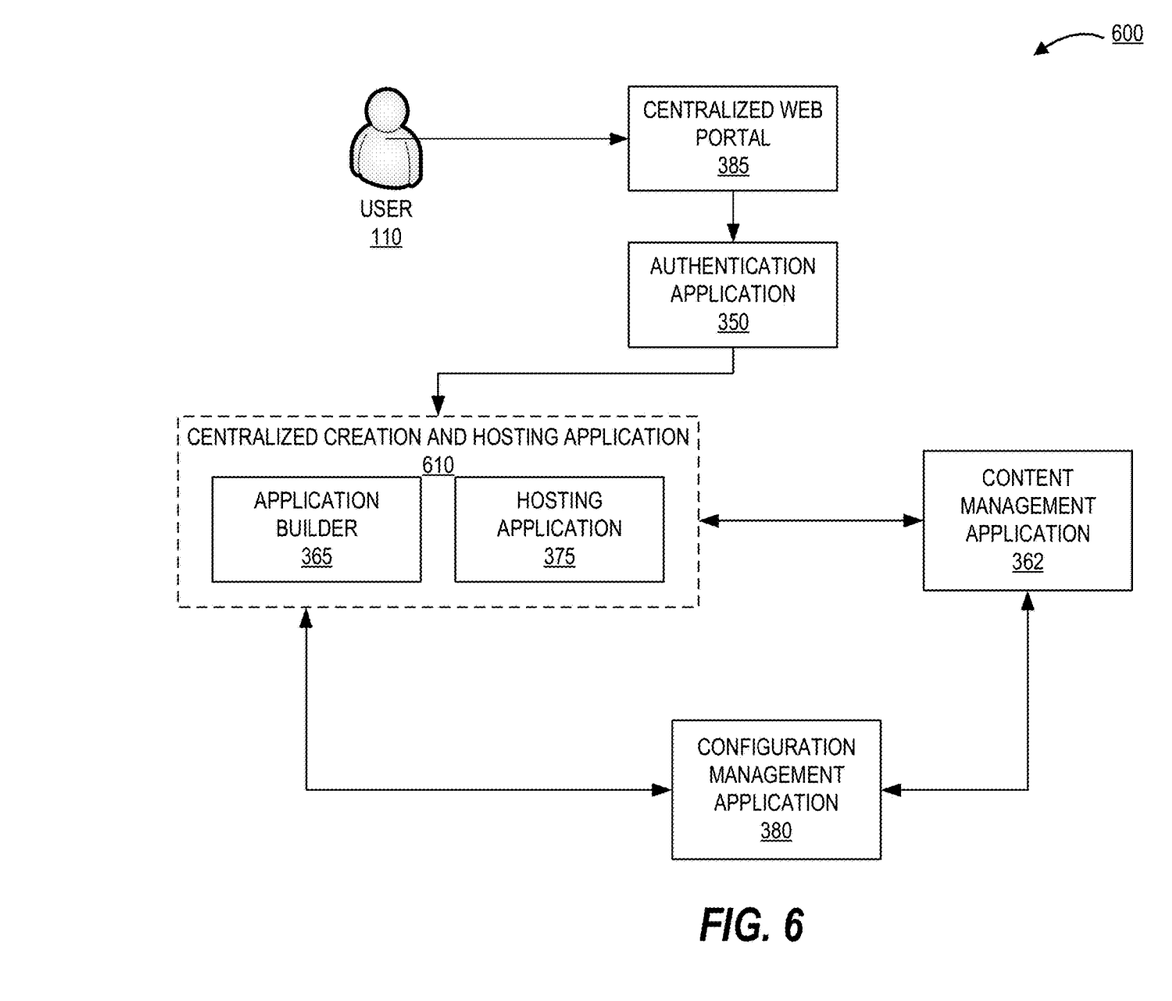
FIG. 6 provides a block diagram illustrating the process flow for dynamically creating and hosting static and dynamic applications, in accordance with an embodiment of the invention.

FIG. 6 provides a block diagram illustrating the process flow for dynamically creating and hosting static and dynamic applications, in accordance with an embodiment of the invention. As shown the user 110 may log into the centralized web portal 385 by providing one or more login credentials. Upon providing the login credentials, the authentication application 350 may authenticate the user 110 and may determine role associated with the user 110. In response to successful authentication of the user 110, the user 110 may provide the one or more inputs as discussed in block 515 of FIG. 5A, where the one or more inputs are associated with one or more web applications that are being created. A centralized creation and hosting application 610 comprising the application builder 365 and hosting application 375 may communicate with the content management application 362 comprising the machine learning application 360 to select and/or generate a template for creating the web page associated with the web application and the configuration management application 380 to host the web application. The content management application 362 may work with the configuration management application 380 may select a server of the one or more servers to host the web application. Upon selecting the server, the content management application 362 may extract a dataset associated with the web application from the server, parse data in the data set, and may apply the data to the template to generate a template preview. The centralized creation and hosting application 610 may display the template preview to the user 110 via the centralized web portal 385 and allows the user 110 to review it. Upon receiving an input associated with the template preview, the centralized creation and hosting application 610 may publish the template (e.g., executes) with the data on the selected server.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for creating and hosting static and dynamic applications, the system comprising:
    at least one network communication interface;
    at least one non-transitory storage device; and
    at least one processing device coupled to the at least one non-transitory storage device and the at least one network communication interface, wherein the at least one processing device is configured to:
        identify that at least one user logged into a centralized web portal;
        authenticate the at least one user based on determining that the at least one user logged into the centralized web portal;

receive one or more inputs from the at least one user, via the centralized web portal, wherein the one or more inputs are associated with creation of one or more applications;

based on the one or more inputs, extract one or more templates and present the one or more templates to the at least one user, via the centralized web portal, wherein the one or more templates comprise at least one template that is instantaneously generated, via an artificial intelligence engine, based at least on historical template data and user preferences associated with the at least one user;

automatically select a template of the one or more templates, via the artificial intelligence engine, based on a type of the one or more applications;

automatically select a server from one or more servers to host the one or more applications based on (i) a role of the at least one user, (ii) utilization of the one or more servers, and (iii) the type of the one or more applications;

establish a connection to the server and extract a data set from the server;

render data in the data set and apply the data to the template, via the artificial intelligence engine;

generate one or more template previews based on applying the data to the template; and display the one or more template previews to the at least one user, via the centralized web portal.

2. The system of claim 1, wherein the at least one processing device is configured to:

receive an input associated with the one or more template previews from the at least one user, via the centralized web portal; and publish the template with the data on the server based on receiving the input associated with the one or more template previews.

3. The system of claim 1, wherein the at least one processing device is configured to:

prompt the at least one user to select the template of the one or more templates; and receive a selection of the template from the at least one user.

4. The system of claim 1, wherein the at least one processing device is configured to:

automatically select the template, via the artificial intelligence engine based on at least one of the user preferences of the at least one user and historical template selection data.

5. The system of claim 1, wherein the at least one processing device is configured to:

instantaneously and automatically generate the template, wherein the template is based on at least one of the user preferences of the at least one user and historical template selection data.

6. The system of claim 1, wherein the at least one processing device is configured to:

identify the role associated with the at least one user based on authenticating the at least one user; and determine that the server of the one or more server is available for the role associated with the at least one user.

7. The system of claim 1, wherein the one or more applications may be a static application or a dynamic application.

8. A computer program product for creating and hosting static and dynamic applications, the computer program product comprising a non-transitory computer-readable storage medium having computer executable instructions for causing a computer processor to perform the steps of:

identifying that at least one user logged into a centralized web portal;

authenticating the at least one user based on determining that the at least one user logged into the centralized web portal;

receiving one or more inputs from the at least one user, via the centralized web portal, wherein the one or more inputs are associated with creation of one or more applications;

based on the one or more inputs, extracting one or more templates and present the one or more templates to the at least one user, via the centralized web portal, wherein the one or more templates comprise at least one template that is instantaneously generated, via an artificial intelligence engine, based at least on historical template data and user preferences associated with the at least one user;

automatically selecting a template of the one or more templates, via the artificial intelligence engine, based on a type of the one or more applications;

automatically selecting a server from one or more servers to host the one or more applications based on (i) a role of the at least one user, (ii) utilization of the one or more servers, and (iii) the type of the one or more applications;

establishing a connection to the server and extract a data set from the server;

rendering data in the data set and apply the data to the template, via the artificial intelligence engine;

generating one or more template previews based on applying the data to the template; and displaying the one or more template previews to the at least one user, via the centralized web portal.

9. The computer program product of claim 8, wherein the computer executable instructions cause the computer processor to perform the steps of:

receiving an input associated with the one or more template previews from the at least one user, via the centralized web portal; and publishing the template with the data on the server based on receiving the input associated with the one or more template previews.

10. The computer program product of claim 8, wherein the computer executable instructions cause the computer processor to perform the steps of:

prompting the at least one user to select the template of the one or more templates; and receiving a selection of the template from the at least one user.

11. The computer program product of claim 8, wherein the computer executable instructions cause the computer processor to perform the step of automatically selecting the template is based on at least one of the user preferences of the at least one user and historical template selection data.

12. The computer program product of claim 8, wherein the computer executable instructions cause the computer processor to perform the step of instantaneously and automatically generating the template, wherein the template is based on at least one of the user preferences of the at least one user and historical template selection data.

13. The computer program product of claim 8, wherein the computer executable instructions cause the computer processor to perform the steps of:

identifying the role associated with the at least one user based on authenticating the at least one user; and determining that the server of the one or more server is available for the role associated with the at least one user.

14. The computer program product of claim 8, wherein the one or more applications may be a static application or a dynamic application.

15. A computer implemented method for creating and hosting static and dynamic applications, wherein the method comprises:
   identifying that at least one user logged into a centralized web portal;
   authenticating the at least one user based on determining that the at least one user logged into the centralized web portal;
   receiving one or more inputs from the at least one user, via the centralized web portal, wherein the one or more inputs are associated with creation of one or more applications;
   based on the one or more inputs, extracting one or more templates and present the one or more templates to the at least one user, via the centralized web portal, wherein the one or more templates comprise at least one template that is instantaneously generated, via an artificial intelligence engine, based at least on historical template data and user preferences associated with the at least one user;
   automatically selecting a template of the one or more templates, via the artificial intelligence engine, based on a type of the one or more applications;
   automatically selecting a server from one or more servers to host the one or more applications based on (i) a role of the at least one user, (ii) utilization of the one or more servers, and (iii) the type of the one or more applications;
   establishing a connection to the server and extract a data set from the server;
   rendering data in the data set and apply the data to the template, via the artificial intelligence engine;
   generating one or more template previews based on applying the data to the template; and
   displaying the one or more template previews to the at least one user, via the centralized web portal.

16. The computer implemented method of claim 15, wherein the method comprises:
   receiving an input associated with the one or more template previews from the at least one user, via the centralized web portal; and
   publishing the template with the data on the server based on receiving the input associated with the one or more template previews.

17. The computer implemented method of claim 15, wherein the method comprises:
   prompting the at least one user to select the template of the one or more templates; and
   receiving a selection of the template from the at least one user.

18. The computer implemented method of claim 15, wherein the method further comprises automatically selecting the template is based on at least one of the user preferences of the at least one user and historical template selection data.

19. The computer implemented method of claim 15, wherein the method further comprises instantaneously and automatically generating the template, wherein the template is based on at least one of the user preferences of the at least one user and historical template selection data.

20. The computer implemented method of claim 15, wherein the method further comprises:
   identifying the role associated with the at least one user based on authenticating the at least one user; and
   determining that the server of the one or more server is available for the role associated with the at least one user.

* * * * *